Feb. 19, 1935.  F. A. DONALDSON  1,992,025
BACKFIRE OIL TRAP FOR AIR CLEANERS
Filed April 26, 1934  2 Sheets-Sheet 2

INVENTOR
Frank A. Donaldson
By His Attorneys

Patented Feb. 19, 1935

1,992,025

UNITED STATES PATENT OFFICE 1,992,025

BACKFIRE OIL TRAP FOR AIR CLEANERS

Frank A. Donaldson, Minneapolis, Minn.

Application April 26, 1934, Serial No. 722,458

12 Claims. (Cl. 183—15)

My present invention provides what is here designated as a back-fire oil trap for air cleaners such as are used in connection with internal combustion engines and, generally stated, consists of the novel devices, combinations of devices and arrangement of parts hereinafter described and defined in the claims.

It is a known fact that in the use of air cleaners of the type wherein oil is employed as a dust-collecting medium, there will frequently or occasionally be back-firing of the engine, which tends to blow the oil from the oil well out through the air intake conduit or passage of the air cleaner. My invention provides a device which will intercept, cage and return the oil to the oil well in case of such back-firing and it is accomplished by providing the air intake conduit of the air cleaner with an expanded trapping chamber, an intercepting baffle and/or co-operating elements arranged to accomplish the above indicated result. This oil trap may be used in connection with various different types of air cleaners but is especially adapted for use in connection with air cleaners wherein oil is employed and wherein there is also provided oil intercepting screens surrounding the air intake conduit.

In the accompanying drawings which illustrate the invention, the same is shown as incorporated in the air intake conduit of an air cleaner of the type disclosed and claimed in pending application, Serial Number 702,482, filed December 15, 1933, by Wilfred W. Lowther, as inventor.

Referring to the drawings, wherein like characters indicate like parts throughout the several views.

Figure 1:
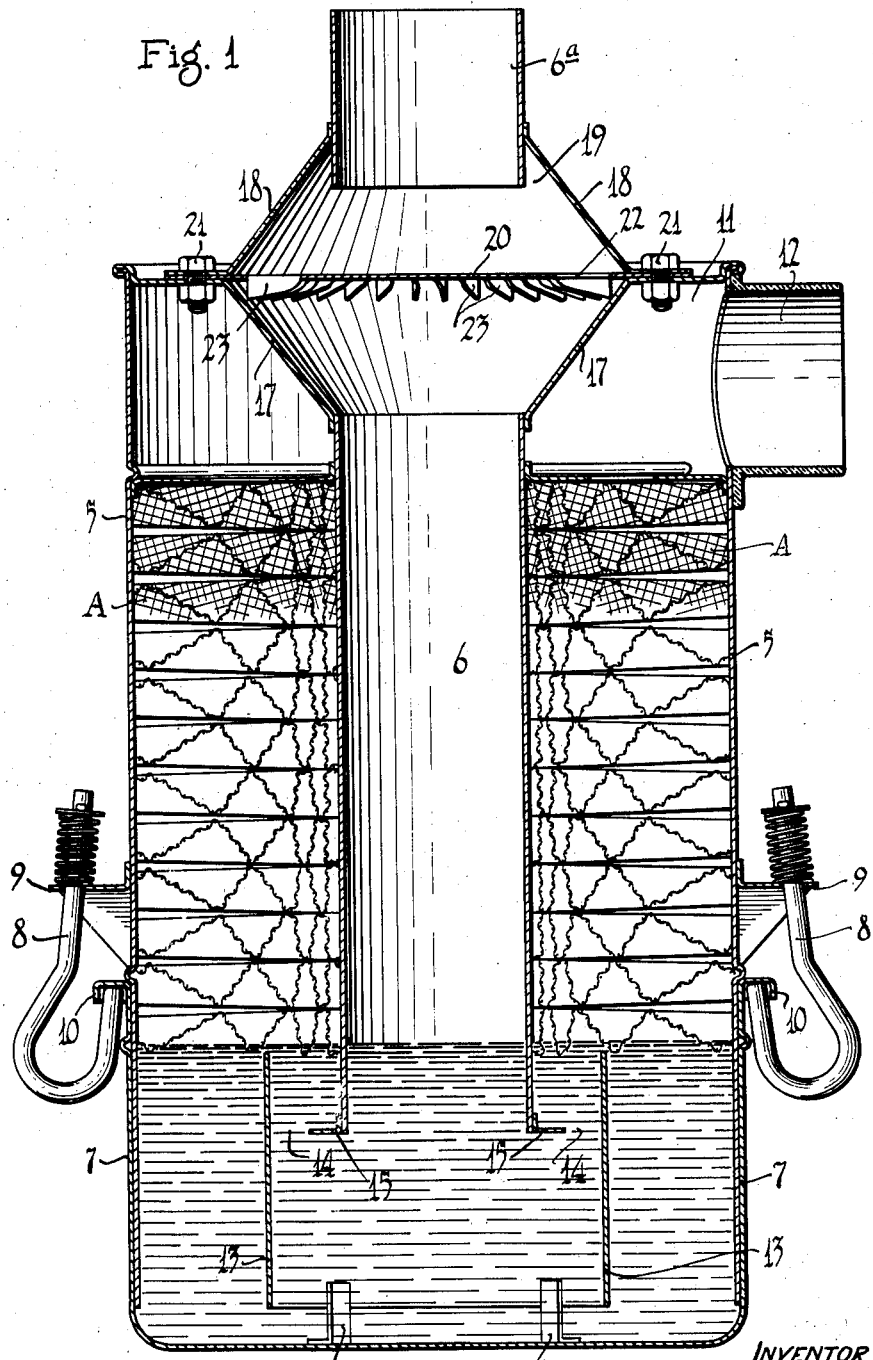
Fig. 1 is a vetrical axial section taken through the air cleaner and back-fire oil trap.
Figure 2:
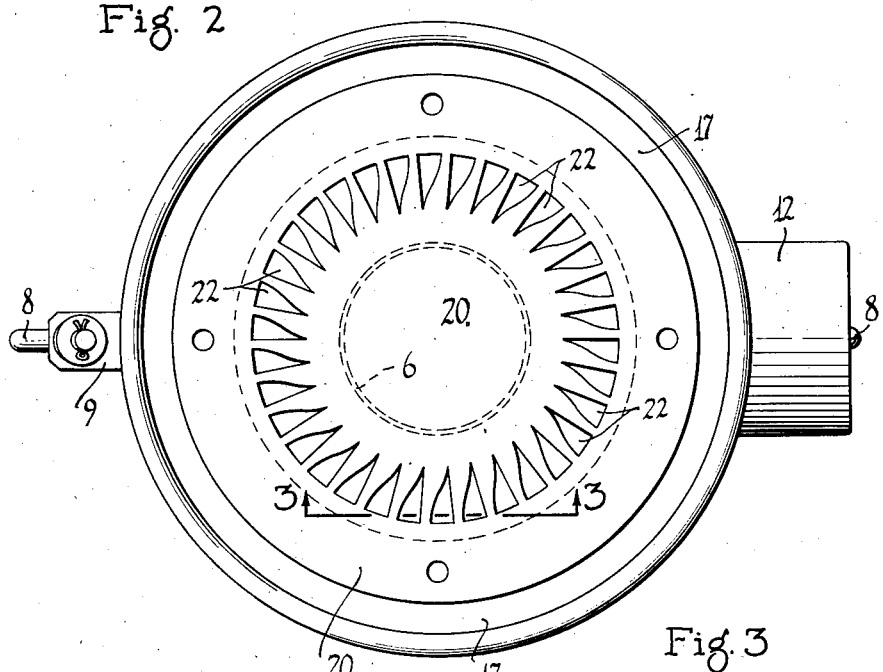
Fig. 2 is a plan view of the parts shown in Fig. 1, with the upper portion of the back-fire oil trap removed.
Figure 3:
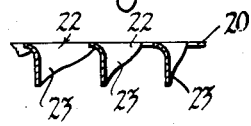
Fig. 3 is a fragmentary section taken on the line 3—3 of Fig. 2.

Referring first to the construction illustrated in Figs. 1, 2 and 3, the air cleaner involves a casing or outer shell 5, preferably in the form of an upright cylinder, the lower end of which is primarily open. An axial air intake tube 6 extends downward through the casing 5. An oil well 7 in the form of a large cup is telescoped onto the lower end of the casing 5 and, of course, normally closes the lower end of said casing. This oil well 7 is made readily detachable and is secured to the casing by suitable means, such as upwardly-spring-pressed hook bolts 8 that work through lugs 9 on the exterior of the casing 5 and engage out-turned lugs 10 on the exterior of the upper edge of said oil well. At the upper end of the casing is an air chamber 11 that surrounds the upper portion of air intake tube 6 and is provided with an air outlet 12 adapted to be coupled to the carburetor of an internal combustion engine. An oil distributing dust-intercepting screen A is placed in the annular space between the casing and air intake tube and extends from the bottom of the air chamber 11 down to a point near but above the lower end of the air intake tube. This screen is preferably made from quite finely woven wire and may take various forms. For example, it may be such as that disclosed in the application of William H. Schulz Serial No. 616,860, filed June 14, 1932, and entitled "Air cleaner".

For the purpose of this case, attention is simply further called to the fact that the screen, as shown, is made up of annular woven wire members, the surfaces of which are inclined in such a way that the oil intercepted will run down over and form films of oil over the openings of said screens and through which oil films the air will be caused to pass, and by which oil films the dust will be intercepted and returned to the oil well.

An annular or endless baffle 13 is placed around the lower end of the air tube 6. This baffle is spaced both from the air intake tube and from the casing and extends both above and below the lower end of said tube. An annular air passage 14 is thus formed between the lower delivery end of the air tube and the said baffle. To restrict the cross-section of this air passage at the extreme lower end of the air tube, the latter is shown as provided with an outstanding annular deflecting flange 15, the important purpose of which will more fully appear in the description of the operation. The baffle 13 may be supported or held in position by any suitable means as, for example, by small angle brackets 16 riveted thereto and to the bottom of the oil well 7. It will be noted that the upper edge of the baffle 13 extends to and practically terminates against the bottom or lowermost portion of the screen A.

The parts just above specifically described are those of the prior application S. N. 702,482, except that the air intake conduit or pipe 6 has an axially aligned and offset outer end section 6ª between which and the main pipe or conduit 6 the improved back-fire oil trap is interposed. This oil trap preferably as designed and as shown is made up of reversely conical lower and upper shell sections 17 and 18, respectively, that form an oil trapping chamber of very considerably greater diameter than the diameter of the tube sections 6 and 6ª. The contracted lower end of the shell 17 is rigidly secured to the upper end of the tube 6 and the contracted upper end of the upper shell section 18 is rigidly attached to the tube section 6ª at a point considerably above its lower end so as to leave an annular trapping channel 19 between the contracted portion of said shell and the depending end of said upper tube section. A disc-like baffle preferably in the form of a thin sheet of metal 20 extends completely across the trapping chamber and its projecting edge is interposed between and clamped to the extended flanges of the sections 17 and 18 preferably by means of nut-equipped bolts 21 which make the upper section 18 and the baffle 20 readily detachable and easily connectible. The baffle 20 is provided with circumferentially spaced small air passages or ports 22 that extend outward of the surfaces of walls of the aligned tube sections 6 and 6ª and, in fact, extend near to but terminate short of the major diameter of the trapping chamber. These air ports 22 are preferably formed by depressing lip-like portions 23 of the baffle 20 so as to form depending veins or louvers.

When the device described is coupled to an internal combustion engine, and the engine is in action, the air will be drawn down through the tubes 6ª, 6, through the oil in the well, and up through the screen A and out through the air outlet 12, all as more fully described in the said prior Lowther application. Under normal operation of the engine, the oil will be carried upward through the screen to a certain extent but will be intercepted by the screen A and caused to run back into the oil well. The air thus drawn from tube 6ª through tube 6 will, of course, have to pass through the circumferentially spaced ports 22 and thus divided into a plurality of streams which will be guided directly downward by the vanes 23, thus preventing the air from being given a whirling action in its downward movement to the oil well.

When back-fire explosions occur, the oil in the well will be blown or violently forced upward through the air intake tube 6 and more or less thereof will be thrust against the imperforate portion of the baffle 20, striking which it will be spread and radially thrown outward against the vanes or ears 23. These vanes, it will be noted, are slightly oblique to radial lines drawn from the axis of the baffle and from the tubes so that the oil striking the same will be given an initial whirling motion, and much thereof will be directed into the annular channel formed between the outer portion of the section 17 and that imperforate portion of the baffle that is just outward of the ports 22. This deflection and whirling action imparted to the oil will prevent much of the oil from passing upward through the ports and will accelerate the return of the oil to the tube 6.

Under a violent back-fire, some of the oil will be blown upward through the ports 22 and against the upwardly and inwardly inclining walls of the upper trap section 18 and following said walls, will be directed into the annular trapping channel 19, while the air separated from the oil will freely pass out through the tube 6ª. Of course, the force of a back-fire is but an impulse and almost instantaneous so that the oil will quickly flow downward and back into the oil under the action of gravity. Moreover, after the engine starts, the inflow of air will assist in returning the oil.

In actual practice, this trapping device has been found highly efficient and it has been found that it will prevent the oil from being blown into the atmosphere from the oil well even where a rapid succession of back-fires take place.

Furthermore, it has been found that this oil trap applied as described, increases to a considerable extent the efficiency of the air cleaner by causing much of the dust taken in by the air to first strike the downwardly and inwardly inclined walls of the lower trap section 17 and thus to fall along the walls of the tube 6 out of the most rapidly travelling central portion of the air current and hence to separate much of such dust from the air current, before it has reached the oil in the well.

Figure 4:
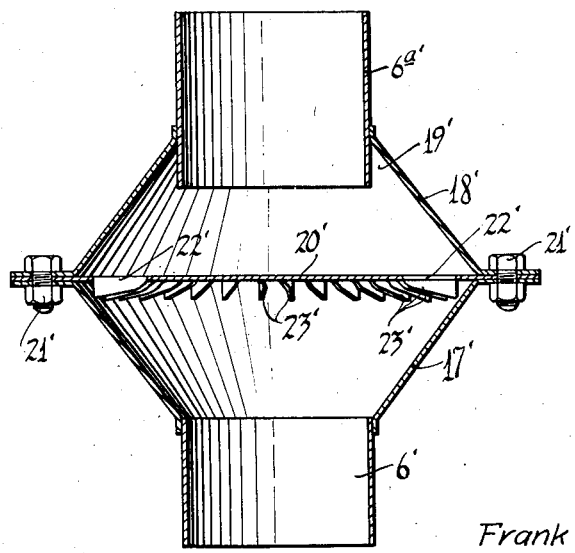
Fig. 4 is an axial section showing the back-fire oil trap as designed independently of the air cleaner and applicable to air cleaners of various different types.

The back-fire oil trap illustrated in Fig. 4 is like that illustrated in Fig. 1 and hence the parts thereof that correspond to parts of the trap shown in Fig. 1 are marked with the same numerals with prime marks added thereto.

From the foregoing, it will be understood that the back-fire oil trap described is capable of various modifications and various applications to air cleaners, all within the scope of the invention herein disclosed and claimed.

What I claim is:

1. The combination with an air cleaner having an oil reservoir, of a back-fire oil trap applied in the air intake conduit thereof and comprising a shell of greater diameter than said air conduit and having therein an oil intercepting baffle with circumferentially spaced ports extended outward beyond the diameter of the said air intake conduit.

2. The combination with an air cleaner having an oil reservoir, of a back-fire oil trap applied in the air intake conduit thereof and comprising a shell of greater diameter than said air conduit and having therein an oil intercepting baffle with circumferentially spaced ports extended outward beyond the diameter of the said air intake conduit, said air intake conduit including an outer end section that is extended into said oil trap so as to form an oil trapping channel surrounding its inner end.

3. The combination with an air cleaner having an oil reservoir and having an air intake conduit formed by axially spaced tubular sections, of a back-fire oil trap interposed between said tubular sections and comprising reversely arranged substantially conical lower and upper portions, the contracted ends of which are connected respectively to the lower and upper sections of said air intake tube, and a baffle extended across the major diameter of said oil trap and provided with circumferentially spaced air ports extended outward therein beyond the diameter of said air intake conduit.

4. The structure defined in claim 1 in which the imperforate central portion of said baffle also extends radially beyond the diameter of said air intake conduit, but not as far radially outward as the air ports thereof.

5. The structure defined in claim 3 in which the baffle has an imperforate central portion that also extends radially beyond the diameter of said air intake conduit, but not as far radially outward as the outer extremities of the air ports thereof.

6. The structure defined in claim 3 in which said outer end section of said air conduit is extended into said oil trap so as to form an oil trapping channel surrounding its inner end.

7. The structure defined in claim 3 in which the upper and lower portions of said oil trap and said baffle are individual elements rigidly connected at their marginal portions.

8. The structure defined in claim 3 in which the upper and lower portions of said oil trap and said baffle are individual elements rigidly connected at their marginal portions, and the outer end section of said air conduit is extended into said oil trap so as to form an oil trapping channel surounding its inner end.

9. The structure defined in claim 1 in which said baffle has depending vanes adjacent said air ports.

10. The structure defined in claim 1 in which said baffle has depending vanes adjacent said air ports, the said vanes being oblique in respect to lines radiating from the axis of said baffle.

11. The structure defined in claim 1 in which the outer extremities of said air ports are located inward of the major diameter of the shell of said trap.

12. The structure defined in claim 1 in which the outer extremities of said air ports are located inward of the major diameter of the shell of said trap and in which said baffle is provided with depending vanes located adjacent said ports, the outer extremities thereof being terminates short of the major diameter of the shell of said trap.

FRANK A. DONALDSON.